United States Patent Office 3,349,123
Patented Oct. 24, 1967

3,349,123
STABILIZATION OF NITROPHENYL
ACYL HALIDES
Harry Flaxman, North Tonawanda, N.Y., assignor to Hooker Chemical Corporation, Niagara Falls, N.Y., a corporation of New York
No Drawing. Filed Sept. 24, 1963, Ser. No. 311,202
22 Claims. (Cl. 260—544)

This application relates to stabilized nitrophenyl acyl halides and to methods for preparing and/or purifying the same. More particularly, this invention relates to mono-nitrophenyl acyl halides and di-nitrophenyl acyl halides stabilized against decomposition and/or polymerization, and methods for preparing them.

Nitrophenyl acyl halides, such as meta nitrobenzoyl chloride, para nitrobenzoyl chloride and dinitrobenzoyl chloride are useful as intermediates in the preparation of agricultural chemicals, such as herbicides. The nitrophenyl acyl halides of this invention tend to decompose upon heating and this decomposition rate can be very rapid, even explosive.

It is an object of this invention to provide a highly concentrated nitrophenyl acyl halide composition stabilized against decomposition and polymerization.

A further object is to provide a method of preparing stabilized nitrophenyl acyl halides. These and other objects of the invention will be apparent from the following detailed description of the invention.

In accordance with this invention there is provided a method for stabilizing nitrophenyl acyl halides against decomposition which comprises admixing with and incorporating in said nitrophenyl acyl halide a stabilizer selected from the group consisting of (a) phosphorus compounds selected from the group consisting of phosphorus halides, especially chlorides and bromides, alkali metal salts and alkaline earth metal salts of phosphorus acids, tetrakis(hydroxyorgano)phosphonium halide and mixtures thereof; (b) boron compounds selected from the group consisting of alkali metal salts and alkaline earth metal salts of acids of boron, boric acid, lead borate, tri-(2-cyclohexylcyclohexyl)borate and mixtures thereof; (c) chelating compounds selected from the group consisting of aminopolycarboxylic acids and alkali metal salts and alkaline earth metal salts thereof; hydroxycarboxylic acids and alkali metal salts and alkaline earth metal salts thereof, and mixtures thereof; and (d) mixtures of compounds in class a, b or c.

Crude nitrophenyl acyl halide may be contaminated by impurities in the starting materials used to prepare the nitrophenyl acyl halide, from the equipment used and/or from the catalyst employed. Typical contaminants include antimony, lead, nickel, aluminum, or compounds thereof, thionyl chloride, sulfuryl chloride and sulfur chlorides. One means of purifying the nitrophenyl acyl halide is distillation of the crude material to obtain a uniform product of high purity. However, heretofore even distillation at less than atmospheric pressure occasionally resulted in rapid or violent evolution of gases such as hydrogen chloride or nitric oxide and/or the production of polymerization products and tars.

It has now been found that certain compounds containing phosphorus, when added in small amounts to the crude nitrophenyl acyl halide effectively stabilize the mixture so that the purification can be safely and conveniently carried out. Suitable phosphorus compounds include (a) the phosphorus chlorides such as phosphorus trichloride, phosphorus pentachloride and thiophosphoryl chloride, (b) the alkali metal salts such as sodium phosphates (including $NaPO_3$, $Na_5P_3O_{10}$, $Na_4P_2O_7$), potassium phosphates (including tetrapotassium pyrophosphate) and the comparable salts of rubidium and cesium, (c) the alkaline earth metal salts (magnesium, calcium, strontium and barium); salts analogous to those of (b), the polyphosphates and phosphates; and (d) tetrakis(hydroxyorgano)phosphonium halides, particularly the tetrakis(hydroxyalkyl)phosphonium halides, in which the alkyl group is of 1 to 6 carbon atoms, such as tetrakis(hydroxymethyl)phosphonium chloride and bromide. Mixtures of the above phosphorus compounds are also suitable for use in this invention.

A similar stabilizing effect is obtained when certain types of boron compounds are employed in the process and compositions of this invention. These compounds include (a) the alkali metal salts such as borax, sodium borate, potassium borate, and the comparable salts of rubidium and cesium; (b) the alkaline earth metal salts such as magnesium, calcium, strontium and barium salts of acids of boron, such as those described in (a); (c) boric acid; and (d) tri-(2-cyclohexylcyclohexyl)borate. Additionally, mixtures of the above boron compounds are useful stabilizers.

A third class of compounds suitable for use in this invention are the aminopolycarboxylic and the hydroxycarboxylic acids and the neutral and partial salts of these acids. The salts are salts of alkali metals and alkaline earth metals such as sodium, potassium, calcium, magnesium, rubidium, cesium, strontium and barium. This third class of compounds for use in this invention are often included within the general term chelating agents and chelating agents of their activities are useful. Suitable acids include, among others, oxalic acid, citric acid, gluconic acid, tartaric acid, hydroxyethyl ethylene diamine triacetic acid, ethylene diamine tetraacetic acid, similar polyamino polycarboxylic acids, sugar acids, nitriltriacetic acid and 1,2-diaminocyclohexane tetraacetic acid. Among the salts of these acids the sodium salts are particularly preferred.

Substantially pure nitrophenyl acyl halide is also stabilized by the method of this invention to increase the stability thereof during heating.

The stabilizing compound is admixed with the nitrophenyl acyl halide in a stabilizing proportion, that is in an amount generally of about 0.05 to 10 percent by weight, usually .05 to 1 percent and preferably between 0.1 and 0.3 percent by weight of the raw unheated mixture of nitrophenyl acyl halide. The nitrophenyl acyl halide may contain higher boiling contaminants of unknown composition. If the proportion of stabilizer is less than about 0.05 percent by weight of the total weight of the mixture, the stabilizing effect upon the distillation of the resultant material is markedly reduced. A proportion in excess of 1.0 percent by weight has a stabilizing effect upon the nitrophenyl acyl halide during the heating process but may unnecessarily modify the final product.

The stability of the nitrophenyl acyl halide can be evaluated by performing a standard distillation process. Distillation is effected in a conventional distillation apparatus comprised of a pot, column, condenser, condensate receiver and venting means. The column used for evaluating the samples was a short empty stack, providing an up and over distillation.

In initiating the up and over distillation operation, the impure nitrophenyl acyl halide is admixed with stabilizer and the mixture is charged into the distillation pot and heated to the boiling point. The atmospheric boiling temperature of the pot liquor is initially about 268 degrees centigrade, but this temperature gradually increases as the distillation progresses. It is convenient to discontinue the distillation when the pot temperature rises above about 320 degrees centigrade, leaving a small portion of nitrophenyl acyl halide in the pot residue for disposal. The distillation may also be carried out at reduced pressure such as 30 to 40 millimeters of mercury (absolute) or such other reduced pressure as is convenient with correspondingly reduced temperatures.

The vapor or gas phase produced during the distillation is divided into two fractions on the basis of temperature. The first fraction, or foreshot, is the vapor discharged from the top of the column at a vapor temperature of below about 250 degrees centigrade and preferably below about 260 degrees centigrade. The foreshot is a mixture of the low boiling fractions and nitrophenyl acyl halide and comprises generally less than five percent by weight of the initial charging stock. The foreshot is collected and may be recycled for recovery of the nitrophenyl acyl halide.

The second vapor fraction, or concentrate fraction, is the vapor leaving the top of the column at a vapor temperature between about 260 degrees centigrade and about 290 degrees centigrade. The product in its most concentrated form is usually obtained between about 265 degrees centigrade and about 280 degrees centigrade. This fraction is liquefied by cooling in the condenser to a temperature below the boiling point and above the freezing point and preferably to a temperature between about 90 degrees centigrade and about 110 degrees centigrade. Substantially all of the resulting condensate is conveyed to the condensate receiver.

When the vapor temperature at the top of the column rises above about 295 degrees centigrade, the distillation is discontinued. Preferably, it is halted even lower, at about 285 degrees centigrade. Although the distillation is controlled by the vapor temperature, it is desirable to discontinue the distillation when the pot residue reaches a temperature of about 320 degrees centigrade, and preferably about 300 degrees centigrade. Pot temperatures above about 320 degrees centigrade should be avoided because exothermic decomposition and polymerization reactions start to take place at this temperature. The pot residue, which is predominantly composed of high boiling compounds of complex composition, is discarded at the end of the distillation cycle.

It has been found that when nitrophenyl acyl halide is heated, e.g., during distillation, in the absence of the stabilizer, the time that the material may be held without decomposition or polymerization at its atmospheric reflux temperature is materially less than when stabilizer is admixed to the nitrophenyl acyl halide. Thus, it is an essential feature of the instant invention to carry out the heating process, e.g., distillation, of nitrophenyl acyl halide in the presence of the stabilzer.

The following examples are presented to further illustrate the invention, yet without any intention of being limited thereby. All parts and percentages are by weight and all temperatures are in degrees centigrade, unless otherwise specified.

In the distillation heating process described below, a crude mixture of 98 percent nitrophenyl acyl halide also having therein small amounts of iron, lead, antimony, nickel as contaminants, and the remainder of its components being of a complex composition.

*Example 1*

10 grams of crude meta nitrobenzoyl chloride were admixed with 100 milligrams (mg.) of phosphorus trichloride ($PCl_3$). The resulting mixture was placed in a test tube, the bottom of which served as a still pot and the sides of which served as a condenser. Venting means for the vapors were provided by a wad of glass wool in the mouth of the test tube. The crude material in the 25 millimeter by 150 millimeter test tube was kept at its atmospheric reflux temperature by using a micro Bunsen burner flame. Temperature measuring means were provided in the molten crude in the bottom of the test tube. The contents of the test tube refluxed at their atmospheric boiling point until a rapid rise in the temperature to about 350 degrees centigrade occurred. This denoted the beginning of decomposition and polymerization of the crude meta nitrobenzoyl chloride. The crude containing 100 milligrams of $PCl_3$ stabilizer remained at its atmospheric reflux temperature for 26 minutes while a control sample of unstabilized crude (containing no $PCl_3$) remained at its reflux temperature for only four minutes.

*Example 2*

10 grams of para nitrobenzoyl chloride, known to be stable, were mixed with 5,000 parts per million of ferric chloride ($FeCl_3$), a known catalyst rendering para nitrobenzoyl chloride unstable and then were admixed with 50 milligrams of $PCl_3$. Distillation of the resulting mixture was effected as described in Example 1. Crude mixture containing 50 milligrams of $PCl_3$ remained at its atmospheric reflux temperature for 11 minutes while a control sample of the unstabilized material (containing 5,000 parts per million $FeCl_3$ but no $PCl_3$) remained at its atmospheric reflux temperature for only two minutes.

*Example 3*

Example 2 was repeated except that 100 milligrams of $PCl_3$ were used. The stabilized crude mixture remained at its atmospheric reflux temperature for 36 minutes while the control sample of unstabilized crude mixture (containing no $PCl_3$) remained at its atmospheric temperature for only two minutes.

Comparable results are obtained when phosphorus pentachloride is substituted for the $PCl_3$ of Example 3.

*Example 4*

Example 1 was repeated except that 100 milligrams tetrapotassium pyrophosphate (TKPP) were used instead of $PCl_3$. The stabilized crude meta nitrobenzoyl chloride remained at its atmospheric reflux temperature for 35 minutes while the control sample of unstabilized crude (containing no TKPP) remained at its atmospheric reflux temperature for only four minutes.

In a manner similar to Example 4, sodium phosphate, $Na_5P_3O_{10}$ and $Na_4P_2O_7$ are employed to stabilize the nitrophenyl acyl halide.

*Example 5*

Example 1 was repeated except that 100 milligrams tetrakis(hydroxymethyl)phosphonium chloride (THPC) were used instead of $PCl_3$. The stabilized crude meta nitrobenzoyl chloride remained at its atmospheric reflux temperature for more than 35 minutes while the control sample of unstabilized crude mixture (containing no THPC) remained at its atmospheric reflux temperature for only four minutes.

*Example 6*

Example 1 was repeated except that 100 milligrams thiophosphoryl chloride ($PSCl_3$) were used instead of $PCl_3$. The stabilized crude meta nitrobenzoyl chloride remained at its atmospheric reflux temperature for more than 35 minutes while the control sample of unstabilized crude mixture (containing no $PSCl_3$) remained at its atmospheric reflux temperature for only four minutes.

*Example 7*

10 grams of crude 3,5-dinitrobenzoyl chloride were admixed with 100 milligrams of thiophosphoryl chloride ($PSCl_3$). The apparatus and procedure were that of Example 1. The stabilized crude 3,5-dinitrobenzoyl chloride remained at its atmospheric reflux temperature for 5 minutes while the control sample of unstabilized crude mixture (containing no $PSCl_3$) was decomposed without remaining at its atmospheric reflux temperature for any measurable period of time.

*Example 8*

Using the procedure and apparatus of Example 1, 100 milligrams of sodium borate were admixed with 10 grams of crude meta nitrobenzoyl chloride. The stabilized mixture remained at its atmospheric reflux temperature for 36 minutes while an unstabilized control sample of the crude mixture remained at atmospheric reflux temperature for only four minutes.

Results similar to Example 8 are obtained when the stabilizer is boric acid or an alkaline earth salt thereof, such as calcium or lead borate.

*Example 9*

Example 2 was repeated except that 50 milligrams of tri(2-cyclohexylcyclohexyl)borate were substituted for the $PCl_3$. The borate-containing sample remained at atmospheric reflux temperature for five minutes while the unstabilized control sample remained at atmospheric reflux for only two minutes.

*Example 10*

To 10 grams of crude 3,5-dinitrobenzoyl chloride were admixed 100 milligrams of tri(2-cyclohexylcyclohexyl) borate. The mixture was tested in a manner similar to Example 1. The borate stabilized sample remained at atmospheric reflux for five minutes while the unstabilized control did not remain at atmospheric reflux temperature for a measurable period of time.

*Example 11*

10 grams of a para nitrobenzoyl chloride known to be stable were mixed with 5,000 parts per million of ferric chloride ($FeCl_3$), and then admixed with 50 milligrams of oxalic acid. Distillation of the resulting mixture was effected as in Example 1. The crude mixture containing oxalic acid remained at its atmospheric reflux temperature for 28 minutes while a control sample of unstabilized material (containing 5,000 parts per million $FeCl_3$ but no oxalic acid) remained at its atmospheric reflux temperature for only two minutes.

Similar results are obtained when tartaric, gluconic and citric acids are used rather than oxalic acid of Example 11.

*Example 12*

Example 3 was repeated except that 100 milligrams of MDA 281, an ethylene diamine acetic acid product, manufactured by Geigy Industrial Chemicals, Yonkers, N.Y., were used as the stabilizer. The stabilized product remained at atmospheric reflux temperature for 13 minutes.

*Example 13*

Example 7 was repeated except that 100 milligrams of MDA 12, an ethylene diamine acetic acid product, manufactured by Geigy Industrial Chemicals, were used as a stabilizer. The stabilized product remained at atmospheric reflux temperature for five minutes.

*Example 14*

Example 7 was repeated except that 50 milligrams of MDA, a hydroxyethyl ethylene diamine triacetic acid product, manufactured by Geigy Industrial Chemicals were used as the stabilizer. The stabilized 3,5-dinitrobenzoyl chloride sample remained at atmospheric reflux temperature for eleven minutes.

Various changes and modifications may be made and equivalents may be substituted in the method and composition of this invention, certain preferred forms of which have been herein described, without departing from the scope of this invention. Such modifications are to be regarded as within the scope of this invention.

What is claimed is:

1. A composition stabilized against decomposition comprised of a nitrobenzoyl chloride and a stabilizing proportion of a compound selected from the group consisting of
   (a) phosphorus compounds selected from the group consisting of phosphorus bromides, thiophosphoryl chloride, alkali metal phosphates, alkaline earth metal phosphates, tetrakis(hydroxyalkyl)phosphonium halides and mixtures thereof;
   (b) boron compounds selected from the group consisting of boric acid, alkali metal borates, alkaline earth metal borates, lead borate, tri-(2-cyclohexylcyclohexyl)borate and mixtures thereof;
   (c) chelating compounds selected from the group consisting of oxalic acid, citric acid, gluconic acid, tartaric acid, hydroxyethyl ethylene diamine triacetic acid, ethylene diamine tetraacetic acid, nitrilotriacetic acid, and 1,2-diaminocyclohexane tetraacetic acid, the alkali metal salts of such acids, the alkaline earth metal salts of such acids, and mixtures thereof; and
   (d) mixtures thereof.

2. A composition stabilized against decomposition according to claim 1 wherein the stabilizing compound is present in the amount of about 0.05 to about 1.0 percent by weight of the nitrobenzoyl chloride.

3. The composition according to claim 1 wherein the stabilizing agent is sodium phosphate.

4. The composition of claim 1 wherein the nitrobenzoyl chloride is meta nitrobenzoyl chloride.

5. The composition of claim 1 wherein the nitrobenzoyl chloride is para nitrobenzoyl chloride.

6. The composition of claim 1 wherein the nitrobenzoyl chloride is 3,5-dinitrobenzoyl chloride.

7. The composition of claim 1 wherein the stabilizing agent is tetrapotassium pyrophosphate.

8. The composition of claim 1 wherein the stabilizing agent is tetrakis(hydroxymethyl)phosphonium chloride.

9. The composition according to claim 1 wherein the stabilizing agent is thiophosphoryl chloride.

10. The composition according to claim 1 wherein the stabilizing agent is sodium borate.

11. The composition according to claim 1 wherein the stabilizing agent is tri-(2-cyclohexylcyclohexyl)borate.

12. The composition according to claim 1 wherein the stabilizing agent is boric acid.

13. The composition according to claim 1 wherein the stabilizing agent is lead borate.

14. The composition according to claim 1 wherein the stabilizing agent is calcium borate.

15. The composition according to claim 1 wherein the stabilizing agent is oxalic acid.

16. The composition according to claim 2 wherein the stabilizing compound is a phosphorus compound selected from the group consisting of phosphorus pentachloride, thiophosphoryl chloride and tetrakis(hydroxyalkyl)phosphonium halide, wherein the alkyl is of 1 to six carbon atoms, and mixtures thereof.

17. The composition according to claim 2 wherein the stabilizing compound is borate selected from the group consisting of alkali metal borates and alkaline earth metal borates, boric acid, lead borate, tri-(2-cyclohexylcyclohexyl)borate and mixtures thereof.

18. The composition according to claim 2 wherein the stabilizing compound is a chelating compound selected from the group consisting of oxalic acid, citric acid, gluconic acid, tartaric acid, hydroxyethyl ethylene diamine triacetic acid, ethylene diamine tetraacetic acid, nitrilotriacetic acid and 1,2-diaminocyclohexane tetraacetic acid, the alkali metal salts of such acids, the alkaline earth metal salts of such acids, and mixtures thereof.

19. A composition stabilized against decomposition comprising a nitrobenzoyl chloride and a stabilizing proportion, from 0.05 to 1.0 percent by weight of the nitrobenzoyl chloride, of phosphorus trichloride.

20. A composition stabilized against decomposition consisting of a nitrobenzoyl chloride and a stabilizing proportion of a compound selected from the group consisting of phosphorus trichloride and phosphorus pentachloride.

21. The method of purifying nitrobenzoyl chloride which comprises
   (1) admixing nitrobenzoyl chloride with a stabilizing proportion of a compound selected from the group consisting of
      (a) phosphorus compounds selected from the group consisting of phosphorus halides, thiophosphoryl chloride, alkali metal phosphates, alkaline earth metal phosphates, tetrakis(hydroxyalkyl)phosphonium halides and mixtures thereof;
(b) boron compounds selected from the group consisting of boric acid, alkali metal borates, alkaline earth metal borates, lead borate, tri-(2-cyclohexylcyclohexyl)borate and mixtures thereof;
(c) chelating compounds selected from the group consisting of oxalic acid, citric acid, gluconic acid, tartaric acid, hydroxyethyl ethylene diamine triacetic acid, ethylene diamine tetraacetic acid, nitrilotriacetic acid, and 1,2-diaminocyclohexane tetraacetic acid, the alkali metal salts of such acids, the alkaline earth metal salts of such acids, and mixtures thereof; and
(d) mixtures thereof and thereafter;
(2) distilling said mixture to obtain a purified nitrophenyl benzoyl chloride.

22. A method according to claim 21, wherein the nitrobenzoyl chloride being stabilized is selected from the group consisting of meta nitrobenzoyl chloride, para nitrobenzoyl chloride and 3,5-dinitrobenzoyl chloride, the stabilizing proportion of compound added is from 0.05 to 1.0 percent by weight on the basis of the material treated and the purified nitrobenzoyl chloride is distilled over at a temperature in the range of 260 to 290 degrees centigrade and condensed.

References Cited
UNITED STATES PATENTS 2,048,768  7/1936  Anderson _____ 260—544

FOREIGN PATENTS 68,007  10/1913  Switzerland.

RICHARD K. JACKSON, *Primary Examiner.*